Sept. 24, 1963 A. MACOVSKI 3,105,109

RECEIVER HAVING AUTOMATIC GAIN CONTROL VOLTAGE DETERMINED BY BURST DURING COLOR RECEPTION

Filed Feb. 12, 1962 2 Sheets-Sheet 1

INVENTOR.

ALBERT MACOVSKI

BY

Attorney

INVENTOR.
ALBERT MACOVSKI
BY
W. O. Sprague
Attorney 3,105,109

RECEIVER HAVING AUTOMATIC GAIN CONTROL VOLTAGE DETERMINED BY BURST DURING COLOR RECEPTION

Albert Macovski, Palo Alto, Calif., assignor to Radio Corporation of America, a corporation of Delaware Filed Feb. 12, 1962, Ser. No. 172,484
8 Claims. (Cl. 178—5.4)

Figure 1:
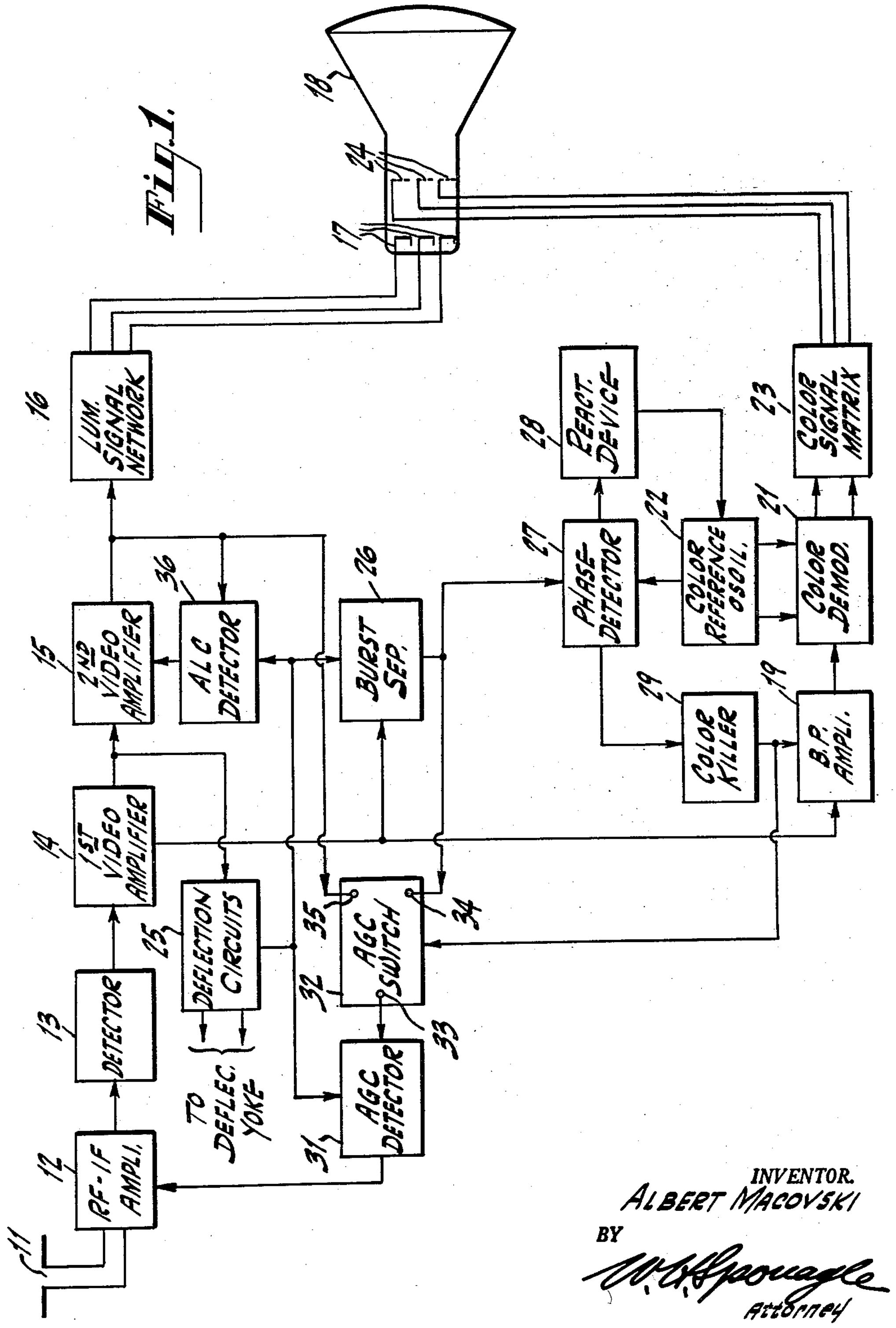

This invention relates to color television image reproducing apparatus and particularly to apparatus for automatically controlling the subjective color quality of the reproduced images.

The color television system presently standardized in the United States employs a composite video signal including a luminance component and a chrominance component. The luminance component is of the same general type as that used in black and white television systems and has a frequency band from a relatively low frequency to about 4 mc. per second. The chrominance component is a subcarrier wave which is modulated in phase to represent hue and in amplitude to represent color intensity. The chrominance component occupies a smaller frequency band than the luminance component and this smaller band is located at the high frequency end of the luminance component frequency band.

The difference in frequencies between the luminance and chrominance components may, at a given receiving location, result in the relative amplitude of the two components being changed when the composite signal is transmitted over the air because frequency selective attenuations may exist in the transmission paths. Such a change in relative amplitudes of the luminance and chrominance components may result in the reproduction of a color image with color and contrast values which are not optimum.

As transmitted, the composite color television signal has, in addition to the luminance and chrominance components previously mentioned, horizontal deflection synchronizing pulses and color synchronizing bursts of the color subcarrier wave. The horizontal synchronizing pulses and the subcarrier bursts are transmitted with certain specified amplitudes relative to one another. The horizontal synchronizing pulses have a repetition rate of approximately 15,750 cycles per second and the color bursts have the color subcarrier wave frequency of approximately 3.58 mc. per second. Thus, the relative amplitudes of the horizontal synchronizing pulses and the color synchronizing bursts in the received signal indicate the nature and extent of any frequency selective effects in the transmission path upon the chrominance component. They likewise indicate any variation in the chrominance component which may occur between television stations.

It is an object of the present invention to control automatically the luminance and chrominance components of the received composite video signal in a novel manner in response to horizontal synchronizing pulses and color synchronizing bursts to maintain good subjective color quality of the reproduced image.

The present invention controls the level of both luminance and chrominance components as a function of the amplitude of the color synchronizing bursts and additionally the level of the luminance component alone as a function of the amplitude of the horizontal synchronizing pulses.

Figure 2:
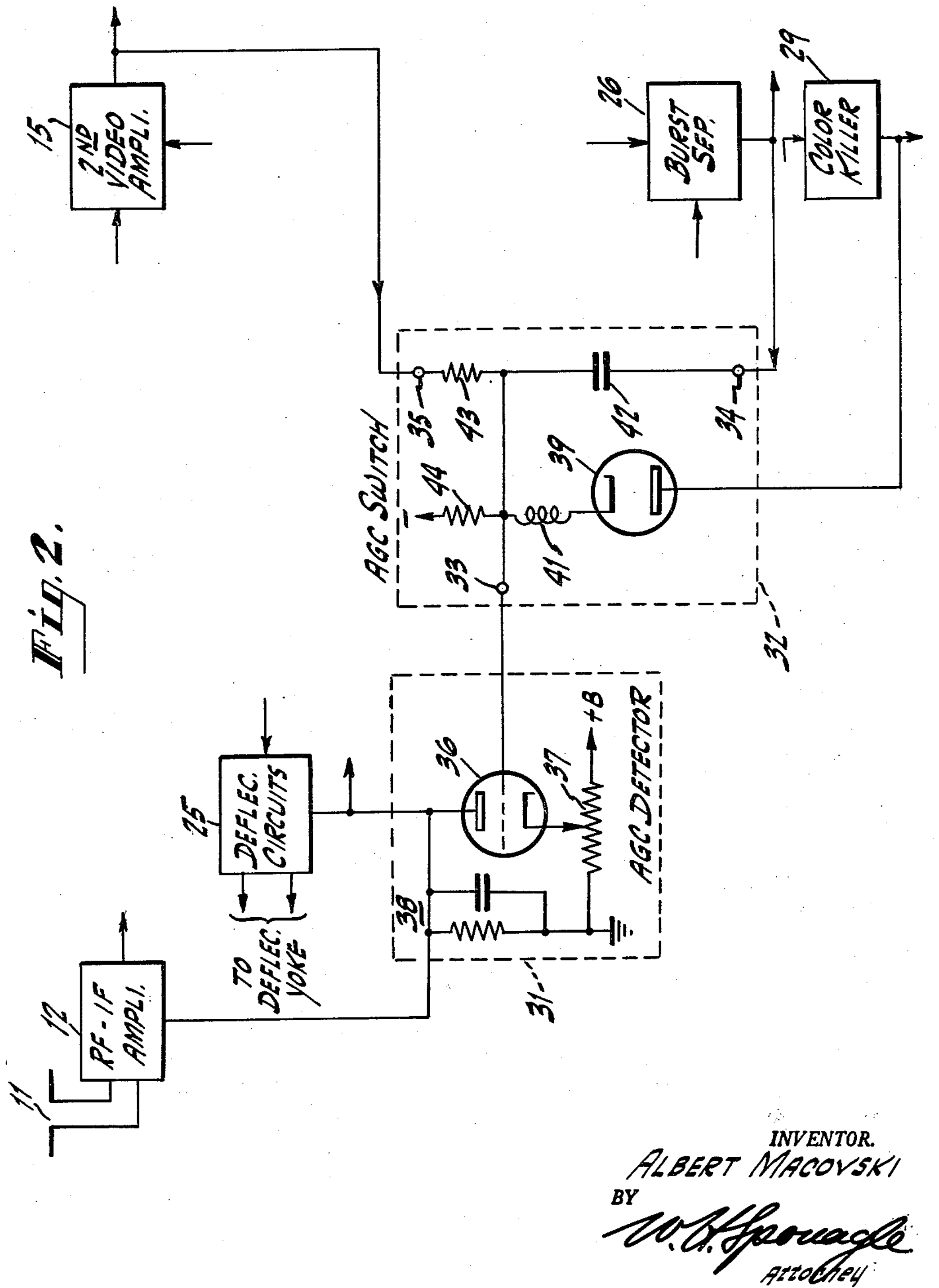

For a better understanding of the invention reference may be had to the following description given in connection with the accompanying drawings of which:

FIGURE 1 is a block diagram of a color television receiver which may be employed to reproduce either a color image or a black and white image and which embodies the present invention; and FIGURE 2 is a schematic circuit diagram of a part of the color television receiver of FIGURE 1 illustrating the details of a novel switching feature used in the practice of the invention.

Reference first is made to FIGURE 1. The composite color television signal received by an antenna 11 is processed in the RF–IF amplifier 12 and in the detector 13 to produce a composite video signal comprising luminance and chrominance components, deflection synchronizing pulses and color synchronizing bursts. The composite video signal is amplified in a first video amplifier 14. At least the luminance component is further amplified by a second video amplifier 15 and is impressed upon a luminance signal network 16 in which it is suitably processed in a conventional manner to produce three separate luminance signals which may have different amplitudes. These luminance signals are impressed respectively upon the cathodes 17 of the red, green and blue electron guns of a tricolor kinescope 18. Such a kinescope may be a shadow mask kinescope such as the 21CYP22A, the 21FBP22 or the 21FJP22, all of which are presently used in color television receivers. The chrominance component of the composite output signal is separated by a bandpass amplifier 19 which is coupled to an output of the first video amplifier 14 as is customary. The amplifier 19 responds substantially only to that portion of the composite signal including the color subcarrier and its modulation sidebands. The output of the bandpass amplifier is coupled to a color demodulator 21 which also receives suitable phases of a demodulating color reference wave from a color reference oscillator 22. The color representative signals derived from the color demodulator 21 are suitably combined in a color signal matrix 23 to produce red, green and blue color difference signals which are impressed upon the control grids 24 of the color kinescope 18. By means of the luminance signals impressed upon the cathodes 17 and the color difference signals impressed upon the control grids 24 of the three electron guns of the color kinescope the electron beams are modulated suitably to represent the red, green and blue color components of the image to be reproduced.

The deflection synchronizing pulses of the received composite signal are employed to control deflection of the electron beams of the color kinescope 18 in a conventional manner. This is accomplished by coupling the deflection circuits 25 to an output of the first video amplifier 14 for the derivation of the synchronizing pulses. The deflection circuits utilize these pulses in a conventional manner to energize the deflection yoke (not shown) provided for the color kinescope.

An output of the first video amplifier 14 also is coupled to a burst separator 26 which functions under the control of keying pulses derived from the deflection circuits 25 to separate the color synchronizing bursts from the composite signal. The separated bursts are impressed upon a phase detector 27 together with the color reference wave derived from the color reference oscillator 22. Any deviation in phase of the color reference wave from the bursts is detected and used to bring the color reference wave oscillations into proper phase by means of a reactance device 28 coupled between the phase detector 27 and the frequency and phase controlling circuits of the color reference oscillator 22.

The receiver also includes a color killer 29 which is coupled to the phase detector 27 to receive a control signal representative of the amplitude of the received color synchronizing bursts. The color killer also is coupled to the bandpass amplifier so as to render it operative when the received color synchronizing bursts exceed a predetermined amplitude and to render this amplifier inoperative when the bursts do not exceed the predetermined amplitude or when they are absent entirely as during the reception of a black and white television signal. Such a receiver embodying the present invention also includes an AGC detector 31 which functions in response to supplied information to control the gain of the RF and/or IF stages of the RF–IF amplifier 12.

The components of the color television represented in FIGURE 1 and described up to this point are those usually found in a color television receiver such as that described in Color Television Receiver Service Data—1954 No. T13—published by RCA Service Company, Inc., a division of Radio Corporation of America, Camden, New Jersey. Also, these components function in their customary manners.

The information supplied to the AGC detector 31 is either the color synchronizing bursts or the horizontal synchronizing pulses. The particular information which is supplied to the AGC detector is determined by an AGC switch 32, the details of which will be described subsequently with reference to FIGURE 2. The output terminal 33 of this switch is connected to the AGC detector. The switch also is provided with two input terminals 34 and 35. The input terminal 34 is coupled to the burst separator 26 so as to receive therefrom color synchronizing bursts and the input terminal 35 is coupled to the output of the second video amplifier 15 to receive therefrom signals which include the horizontal synchronizing pulses. The output terminal 33 is effectively coupled to one or the other of the input terminals under the control of a signal derived from the color killer 29 so that, for operation in response to a received color television signal, the output terminal 33 of the AGC switch is effectively connected to the input terminal 34 and, during the reception of a black and white signal, the output terminal is effectively connected to the input terminal 35.

The color television receiver embodying the present invention also includes an ALC (automatic luminance control) detector 36. This detector is coupled to the output of the second video amplifier 15 to receive a signal including the horizontal synchronizing pulses. The ALC detector functions in the same general manner as the AGC detector 31 under the control of keying pulses derived from the deflection circuits 25 to produce a unidirectional signal representative of the amplitude of the horizontal synchronizing pulses. This unidirectional voltage is applied to the gain control circuit of the second video amplifier 15.

The operation of the apparatus of FIGURE 1 embodying the present invention in response to the reception of a color television signal first will be described. Assume initially that the color synchronizing bursts and the chrominance component of the received composite television signal are attenuated in transmission to a greater degree than the luminance component. This condition will also cause the color synchronizing bursts to be more attenuated than the horizontal synchronizing pulses. So long as the bursts are of sufficient amplitude to enable the chrominance signal apparatus to function properly to make a color image the color killer 29 will maintain the AGC switch 32 in the condition such that its output terminal 33 is effectively connected to the input terminal 34. Thus, the reduced amplitude bursts derived from the burst amplifier 36 are impressed upon the AGC detector 31 which functions to produce a unidirectional control voltage of such a character that, when impressed upon the RF–IF amplifier 12, the gain of this apparatus is increased. This action results in the production of an increased amplitude chrominance component for processing by the chrominance channel apparatus including the bandpass amplifier 19, the color demodulator 21 and the color matrix 23 for impression upon the color kinescope 18. This increased amplitude signal is of a character tending to restore the saturation of the reproduced image to normal.

By increasing the gain of the RF–IF amplifier 12 as described, however, not only is the chrominance component of the received signal increased in amplitude but also the luminance component is increased in like proportion inasmuch as both components are amplified by the amplifier 12. If a luminance component of such increased amplitude were impressed upon the color kinescope 18, the saturation of the reproduced image would not be restored. In order to prevent such action, the horizontal synchronizing pulses representative of the luminance component amplitude, when impressed upon the ALC detector 36, are effective to produce a unidirectional control voltage for the gain control circuit of the second video amplifier 15 of such a character as to decrease the amplitude of the luminance component appearing in the output of this amplifier. By such means the amplitude of the luminance component signals impressed upon the color kinescope 18 are effectively maintained at their original level. Hence, the described amplitude increase of the chrominance signal component impressed upon the color kinescope results in the reproduction of a color image with proper saturation.

Should the luminance component become more attenuated than the chrominance component in transmission, an over-saturated image would be reproduced in the absence of correction such as provided by this invention. In such a case, the AGC detector 31, in response to the amplitude of the color synchronizing bursts, will as before maintain the amplitude of the burst and the chrominance component constant and also the same relative amplitudes of the luminance and chrominance components through the RF–IF amplifier 12 as in the previously described case. In this situation, however, the horizontal synchronizing pulses derived from the output of the second video amplifier 15, being of lower amplitude than normal, will cause the ALC detector 36 to produce a unidirectional voltage which, when applied to the gain control circuit of the video amplifier 15, will increase its gain suitably to produce a luminance component of proper amplitude relative to the amplitude of the chrominance component to reproduce a color image on the color kinescope 18 with proper saturation.

For operation of the apparatus of FIGURE 1 embodying the invention in response to a received black and white television signal, the color killer 29, in response to the detected absence of the color synchronizing bursts by the phase detector 27, not only renders the bandpass amplifier 19 inoperative, but also effectively connects the output terminal 33 of the AGC switch 32 to the input terminal 35. By reason of this connection the horizontal synchronizing pulses derived from the output of the second video amplifier 15 are used by the AGC detector 31 to control the operation of the RF-IF amplifier 12 in a conventional manner so as to maintain substantially constant the level of the video signal at the output of the second video amplifier 15. In such a case, the ALC detector 36 will function as a device for further refining the operation of the automatic gain control apparatus.

Reference now is made to FIGURE 2 for a description of the automatic gain controlling apparatus including the AGC switch 32 of FIGURE 1. Except for the character of the signals applied to the AGC detector 31, this apparatus is conventional and includes an electron tube 36. The signals in response to which the AGC voltage is produced are applied to the control grid of this tube which is periodically rendered operative by pulses applied to its anode from the deflection circuits 25. The cathode is connected to a potentiometer 37 used to set the operating threshold of the tube. A filter network 38 connected to the anode of the tube 36 functions in the usual manner to convert the pulsating signals developed at the anode into the unidirectional AGC voltage which is applied to the gain controlling circuits of the RF-IF amplifier 12.

The AGC switch 32 includes a diode 39, the cathode of which is connected through an inductor 41 to the output terminal 33 and to the AGC detector 31 and the anode of which is connected to the output of the color killer 29. Color synchronizing bursts derived from the bursts separator 26 are applied to the input terminal 34 which is connected by a capacitor 42 to the output terminal 33. A signal including at least the horizontal synchronizing pulses derived from the output of the second video amplifier 15 is impressed upon the input terminal 35 which is connected by a resistor 43 to the output terminal 33. The output terminal may be connected additionally to a source of negative potential through a resistor 44 for a purpose to be described subsequently.

When a color television signal is being received the voltage derived from the color killer 29 and applied to the anode of the diode 39 is of such polarity and magnitude as to render the diode conducting. The circuit through the diode is of such low impedance to the relatively low frequency luminance signal including the horizontal synchronizing pulses derived from the second video amplifier 15 that this signal is effectively short-circuited and prevented from appearing at the output terminal 33. The circuit from the input terminal 34 through the diode 39, the inductor 41 and the capacitor 42, however, is of sufficiently high impedance to the relatively high frequency burst derived from the burst separator 26 that the burst signal is developed at the output terminal 33. Thus, during the reception of a color television signal, the color synchronizing bursts developed at the output terminal 33 of the AGC switch 32 are impressed upon the input of the AGC detector tube 36, thereby rendering the AGC detector responsive to the color synchronizing bursts to the exclusion of the horizontal synchronizing pulses.

In order to insure that the luminance signal derived from the second video amplifier 15 is effectively short-circuited during the reception of a color signal, it is necessary that the coupling resistor 43 have a value appreciably greater than that of the output load circuit of the color killer 29. Also, for proper operation, it is necessary that the luminance and color killer voltages impressed upon the AGC switch 32 be in the same general range. Because the color killer voltage is of negative polarity in the receiver covered by the Service Data referred to, the luminance signal may also be made negative by means of the resistor 44 connected to the indicated source of negative potential. In such a case, the combined value of the resistors 43 and 44 should be appreciably greater than that of the color killer load circuit.

During the reception of a black and white television signal, the voltage derived from the color killer 29 is sufficiently negative that its application to the anode of the diode 39 renders it non-conducting. There are no color synchronizing bursts applied at this time to the input terminal 34. With the diode 39 in a non-conducting state there no longer exists the low impedance shunting circuit for the horizontal synchronizing pulses applied to the input terminal 35. These pulses, therefore, are developed at the output terminal 33 of the switch and their application to the control grid of the AGC detector tube 36 renders this apparatus responsive to the amplitude of the horizontal synchronizing pulses for the development of an AGC voltage for the described control of the RF-IF amplifier 12.

In a television receiver designed for operation only in response to received color television signals the AGC switch 32 of FIGURE 1 and its connections are not necessary. In such a case the input of the AGC detector 31 would be connected directly to the output of the burst separator 26 so as to render the AGC detector 31 responsive only to the amplitude of the color synchronizing bursts. Also, it will be appreciated that, since the AGC detector 31 is keyed for operation only during the horizontal blanking intervals, the entire chrominance video signal component derived from the output of the band-pass amplifier 19 may be applied to the AGC detector either directly, in the case of a receiver of color signals only, or through the AGC switch 32, in a receiver adapted to receive both color and black and white signals. In such case only the color synchronizing bursts occurring during the horizontal blanking intervals are effective to produce an automatic gain control voltage.

The present invention also may be embedded in a system in which automatic brightness control of the reproduced image is desired. In such a case the ALC detector 36 of FIGURE 1 would be connected to a point in the conventional receiver circuit where it would be responsive to the ultor voltage applied to the color kinescope 18 instead of to the output of the second video amplifier 15 as illustratively disclosed.

Another alternative arrangement within the scope of the present invention is one in which an additional separate final IF amplifier stage and a separate detector for the luminance signal component are provided. The ALC detector 36 would then control the gain of the additional IF amplifier stage by a suitable connection thereto instead of the illustratively disclosed control of the second video amplifier 15.

What is claimed is:

1. In a television receiver including an image reproducing device and adapted to receive both color and black and white television signals, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, and said black and white television signal including a luminance video signal component and deflection synchronizing pulses, the combination comprising:

a common variable gain amplifier for indiscriminately amplifying said luminance and chrominance video signal components, said deflection pulses and said color bursts;

a luminance signal channel including a luminance video signal variable gain amplifier for amplifying substantially only said luminance video signal component and said deflection pulses;

a chrominance signal channel including a color synchronizing burst separator;

an automatic gain control detector operable to produce a gain controlling signal;

means for impressing said gain controlling signal upon said common amplifier to control its gain;

an automatic luminance control detector connected to the output of said luminance video signal amplifier and operable to produce a luminance controlling signal in response to the amplitude of said deflection pulses;

means for impressing said luminance controlling signal upon said luminance video signal amplifier to control its gain;

and means responsive to the presence of said color bursts to connect said automatic gain control detector to said burst separator and responsive to the absence of said color bursts to connect said automatic gain control detector to the output of said luminance video amplifier so as to render said automatic gain detector responsive to the amplitude of said bursts when they are present and to the amplitude of said deflection pulses when said bursts are absent.

2. In a television receiver including an image reproducing device and adapted to receive both color and black and white television signals, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, and said black and white television signal including a luminance video signal component and deflection synchronizing pulses, the combination comprising:

a common variable gain amplifier for indiscriminately amplifying said luminance and chrominance video signal components, said deflection pulses and said color bursts;

a luminance signal channel including a luminance video signal variable gain amplifier for amplifying substantially only said luminance video signal component and said deflection pulses;

a chrominance signal channel including means for processing substantially only said chrominance video signal component and said color bursts;

an automatic gain control detector operable to produce a gain controlling signal;

means for impressing said gain controlling signal upon said common amplifier to control its gain;

an automatic luminance control detector connected to the ouput of said luminance video signal amplifier and operable to produce a luminance controlling signal in response to the amplitude of said deflection pulses;

means for impressing said luminance controlling signal upon said luminance video signal amplifier to control its gain;

and means to connect said automatic gain control detector to said chrominance signal channel when said color bursts are present to render said automatic gain detector responsive to said bursts and to connect said automatic gain control detector to the output of said luminance video amplifier when said bursts are absent.

3. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a common variable gain amplifier for indiscriminately amplifying said luminance and chrominance video signal components, said deflection pulses and said color bursts;

a luminance signal channel including a luminance video signal variable gain amplifier for amplifying substantially only said luminance video signal component and said deflection pulses;

a chrominance signal channel including a color synchronizing burst separator;

an automatic gain control detector operable to produce a gain controlling signal;

means for impressing said gain controlling signal upon said common amplifier to control its gain;

an automatic luminance control detector connected to the output of said luminance video signal amplifier and operable to produce a luminance controlling signal in response to the amplitude of said deflection pulses;

means for impressing said luminance controlling signal upon said luminance video signal amplifier to control its gain;

and means to connect said automatic gain control detector to said burst separator to render said automatic gain detector responsive to the amplitude of said bursts.

4. In a television receiver including an image reproducing device and adapted to receive a color television signal, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising:

a common variable gain amplifier for indiscriminately amplifying said luminance and chrominance video signal components, said deflection pulses and said color bursts;

a luminance signal channel including a luminance video signal variable gain amplifier for amplifying substantially only said luminance video signal component and said deflection pulses;

a chrominance signal channel including means for processing substantially only said chrominance video signal component and said color bursts;

an automatic gain control detector operable to produce a gain controlling signal;

means for impressing said gain controlling signal upon said common amplifier to control its gain;

an automatic luminance control detector connected to the output of said luminance video signal amplifier and operable to produce a luminance controlling signal in response to the amplitude of said deflection pulses;

means for impressing said luminance controlling signal upon said luminance video signal amplifier to control its gain;

and means to connect said automatic gain control detector to said chrominance signal channel to render said automatic gain detector responsive to the amplitude of said bursts.

5. In a television receiver including an image reproducing device and adapted to receive a color television signal, said color signal including a luminance video signal component, a chrominance video signal component in the form of a phase and amplitude modulated subcarirer wave of a given frequency, deflection synchronizing pulses and color synchronizing bursts comprising several cycles of said subcarrier wave frequency and having a predetermined amplitude relationship to the amplitude of said deflection synchronizing pulses, the combination comprising;

a carrier frequency variable gain amplifier for indiscriminately amplifying said luminance and chrominance video signal components, said deflection pulses and said color bursts;

a luminance signal channel including first and second video signal amplifiers, said first video signal amplifier for amplifying said luminance and chrominance components, said deflection pulses and said color bursts, and said second video signal amplifier being a variable gain amplifier for amplifying substantially only said luminance video signal component and said deflection pulses;

a chrominance signal channel including means for processing substantially only said chrominance video signal component and said color bursts, said chrominance channel being coupled to the output of said first video signal amplifier;

an automatic gain control detector operable to produce a gain controlling signal;

means for impressing said gain controlling signal upon said carrier frequency amplifier to control its gain;

an automatic luminance control detector connected to the output of said second viedo signal amplifier and operable to produce a luminance controlling signal in response to the amplitude of said deflection pulses;

means for impressing said luminance controlling signal upon said second video signal amplifier to control its gain;

and means to connect said automatic gain control detector to said chrominance signal channel to render said automatic gain detector responsive to the amplitude of said bursts.

6. In a television receiver including an image reproducing device and adapted to receive both color and black and white television signals, said color signal including a luminance video signal component, a chrominance video signal component in the form of a phase and amplitude modulated subcarrier wave of a given frequency deflection synchronizing pulses and color synchronizing bursts comprising several cycles of said subcarrier wave frequency and having a predetermined amplitude relationship to the amplitude of said deflection synchronizing pulses, and said black and white television signal including a luminance video signal component and deflection synchronizing pulses, the combination comprising:

first amplifying means for indiscriminately amplifying said luminance and chrominance video signal components, said deflection pulses and said color bursts;

second amplifying means coupled to said first amplifying means for amplifying said luminance and chrominance components, said deflection pulses and said color bursts;

third amplifying means coupled to said second amplifying means for amplifying substantially only said luminance video signal component and said deflection pulses;

signal processing means coupled to said second amplifying means for processing substantially only said chrominance video signal component and said color bursts;

means for producing a gain controlling signal;

means for impressing said gain controlling signal upon said first amplifying means to control its gain;

means coupled to said third amplifiyng means for producing a luminance controlling signal in response to the amplitude of said deflection pulses;

means for impressing said luminance controlling signal upon said third amplifying means to control its gain;

and means to connect said gain controlling signal producing means to said signal processing means when said color bursts are present to render said gain controlling signal producing means responsive to said bursts and to connect said gain controlling signal producing means to said third amplifying means when said bursts are absent to render said gain controlling signal producing means responsive to said deflection pulses.

7. In a television receiver including an image reproducing device and adapted to receive both color and black and white television signals, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, and said black and white television signal including a luminance video signal component and deflection synchronizing pulses, the combination comprising:

first amplifying means for amplifying said luminance and chrominance video signal components, said deflection pulses and said color bursts in a manner to maintain the same amplitude relationship between said components, pulses and bursts as received;

second amplifying means for amplifying said luminance and chrominance components, said deflection pulses and said color bursts in a manner to maintain the same amplitude relationship between said components, pulses and bursts as received;

third amplifying means for amplifying substantially only said luminance video signal component and said deflection pulses;

signal processing means for processing substantially only said chrominance video signal component and said color bursts;

means for producing a gain controlling signal;

means for utilizing said gain controlling signal to control the gain of said first amplifying means;

means for producing a luminance controlling signal in response to the amplitude of said deflection pulses;

means for utilizing said luminance controlling signal to control the gain of said third amplifying means;

and means operative when said color bursts are present to render said gain controlling signal producing means responsive to said bursts and operative when said color bursts are absent to render said gain controlling signal producing means responsive to said deflection pulses.

8. In a television receiver including an image reproducing device and adapted to receive both color and black and white television signals, said color signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, and said black and white television signal including a luminance video signal component and deflection synchronizing pulses, the combination comprising:

a carrier frequency variable gain amplifier for indiscriminately amplifying said luminance and chrominance video signal components, said deflection pulses and said color bursts;

a luminance signal channel including first and second video signal amplifiers, said first video signal amplifier for amplifying said luminance and chrominance components, said deflection pulses and said color bursts, and said second video signal amplifier being a variable gain amplifier for amplifying substantially only said luminance video signal component and said deflection pulses and coupled to an output of said first video signal amplifier;

a chrominance signal channel including means for processing substantially only said chrominance video signal component and said color bursts coupled to an output of said first video signal amplifier;

an automatic gain control detector operable to produce a gain controlling signal;

means for impressing said gain controlling signal upon said carrier frequency amplifier to control its gain;

an automatic luminance control detector connected to the output of said second video signal amplifier and operable to produce a luminance controlling signal in response to the amplitude of said deflection pulses;

means for impressing said luminance controlling signal upon said second video signal amplifier to control its gain;

and means to connect said automatic gain control detector to said chrominance signal channel when said color bursts are present to render said automatic gain detector responsive to said bursts and to connect said automatic gain control detector to the output of said second video amplifier when said bursts are absent.

No references cited.